(12) United States Patent
Orrico

(10) Patent No.: US 6,553,675 B2
(45) Date of Patent: Apr. 29, 2003

(54) QUICK RELEASE FOOTPLATE ASSEMBLY FOR A JIGSAW

(75) Inventor: James Orrico, Chicago, IL (US)

(73) Assignee: S-B Power Tool Company, Broadview, IL (US)

( * ) Notice: Subject to any disclaimer, the term of this patent is extended or adjusted under 35 U.S.C. 154(b) by 0 days.

(21) Appl. No.: 09/863,712

(22) Filed: May 23, 2001

(65) Prior Publication Data

US 2002/0174550 A1 Nov. 28, 2002

(51) Int. Cl.[7] ................................................. B23D 51/02
(52) U.S. Cl. ............................................. 30/376; 30/392
(58) Field of Search ........................... 30/374, 375, 376, 30/392, 124

(56) References Cited

U.S. PATENT DOCUMENTS

| 3,087,519 A | * | 4/1963 | McCarty et al. ............... 30/376 |
| 5,012,583 A | * | 5/1991 | Bloche et al. ................. 30/392 |
| 5,727,322 A | | 3/1998 | Giacometti |
| 5,778,538 A | * | 7/1998 | Gentinetta et al. ............ 30/376 |
| 6,230,411 B1 | * | 5/2001 | Wall et al. .................... 30/376 |

* cited by examiner

Primary Examiner—Hwei-Siu Payer
(74) Attorney, Agent, or Firm—Gardner Carton & Douglas, LLC.

(57) ABSTRACT

A releasable footplate assembly for a jigsaw includes a shaft portion having a handle, a screw boss having a yoke, a base portion having a bridge portion through which the screw extends into the screw boss and a bridge plate, attached to the screw, releasably engaging the bridge portion.

20 Claims, 5 Drawing Sheets

QUICK RELEASE FOOTPLATE ASSEMBLY FOR A JIGSAW

FIELD OF THE INVENTION

The present invention relates generally to footplates having a range of adjustment, and more specifically, to a quick release footplate assembly for a jigsaw.

BACKGROUND OF THE INVENTION

Jigsaws are used to cut fine patterns in a workpiece such as lines, circles, curves, and the like. The relatively thin blade of the jigsaw, as opposed, for example, to the relatively large blade of a circular saw, make it ideal for cutting operations which still need to be precise but are not necessarily in a straight line. Portable jigsaws typically include a housing containing an electric motor for reciprocating a saw blade which extends perpendicularly from the bottom of the housing and having cutting teeth that face toward the front of the housing. Typically, a footplate is disposed at the bottom of the housing and provides a generally flat surface to support and guide the jigsaw during cutting. The flat bottom of the footplate is placed on, and slides over, a workpiece being cut so that the operator can guide the blade to obtain the desired cut. The footplate has a slot through which the saw blade extends to engage the workpiece and during cutting the blade reciprocates at this position while the jigsaw is moved in a generally forward direction.

Some jigsaws can also be used to form bevel-edge cuts, which are cuts formed at an angle with respect to the plane of the bottom of the footplate. Such jigsaws include a mechanism for adjusting and locking the position of the footplate with respect to the housing and the saw blade. In use, the blade maintains its perpendicular orientation with respect to the housing, but is at a different angular orientation with respect to the plane of the bottom of the footplate. Thus, since the planar surface of the footplate remains in contact with the planar surface of the workpiece, when the saw blade is maintained at an angle with respect to the footplate, the resulting cutting operation will also be at an angle.

The prior art discloses various mechanisms for adjusting and locking the position of the footplate with respect to the blade of a jigsaw. One such arrangement is disclosed, for example, in U.S. Pat. No. 5,727,322 to Giacometti, assigned to Black & Decker, Inc. As illustrated in FIG. 2 of Giacometti, the locking and adjustment mechanism requires a relatively complex arrangement of many different components. The locking mechanism 58 includes first 114, second 134 and third 152 plates. A locking portion 170 of a lever 60 is disposed between the second 134 and third 152 plates. As shown in FIG. 7, the locking portion 170 of the lever 60 has a wide cross section 180, which is used to force the clamping plates apart and lock the footplate, and a narrow cross section 182, which is used to allow the clamping plates to relax and adjust the footplate. Such an arrangement, however, suffers from many disadvantages. First, the locking portion 170 of the lever 60 provides a movement which is difficult and jerky. Second, as seen in FIG. 10, adjustment of the footplate requires moving the lever 60 beyond the footplate 62, a movement that requires the entire jigsaw to be turned upside-down and does not allow adjustment while the footplate and jigsaw rest upon a workpiece. Third, as seen from FIG. 11, when adjusting the bevel to its extreme angular position, the extent of the angle is limited by the lever and the movement of the lever interferes with the footplate.

Other disadvantages are apparent as well and are similarly present with other prior art designs.

SUMMARY OF THE INVENTION

It is therefore an object of the present invention to provide an improved footplate assembly with a locking and releasing mechanism that allows for easier adjustment thereof.

It is another object of the present invention to provide a footplate assembly that has a simpler design and without a great number of additional components as found in the prior art.

It is also an object of the present invention to provide a footplate assembly that allows for convenient beveled adjustment of the footplate without requiring turning the jigsaw upside-down.

It is a further object of the present invention to provide a footplate assembly that allows for beveled adjustment through a mechanism that provides a smooth transition of force from a released to a locked position so as not to risk misalignment of the desired bevel setting.

It is a further object of the present invention to provide a footplate assembly that does not interfere with the footplate when adjusted to its extreme beveled position. As such, it would be beneficial that the jigsaw need not be turned entirely around in order to access such locking means and that it not interfere with the footplate itself.

The above objects are realized in the present invention which provides a jigsaw footplate adjustment mechanism that produces smooth and even translation of rotational movement to vertical movement. The mechanism includes a cam arrangement with a handle disposed at the back of the jigsaw to provide a smooth camming movement that does not interfere with the position of the footplate.

According to one embodiment of the present invention, there is provided a releasable footplate assembly for a jigsaw including a shaft portion having a handle, a screw boss that rotationally receives a cam portion of the shaft, a base portion having a bridge through which a screw extends, and a bridge plate attached to the screw, which serves to selectively engage the bridge portion of the footplate.

According to a second embodiment of the present invention, there is provided a releasable footplate assembly for a jigsaw including a shaft portion having a handle, a retaining bolt that rotationally receives a cam portion of the shaft, a base portion having a bridge through which the retaining bolt extends, and a bridge plate attached to the retaining bolt with a nut, which serves to selectively engage the bridge portion of the footplate.

BRIEF DESCRIPTION OF THE DRAWINGS

The foregoing and other objects, features, and advantages of the present invention will become apparent from a reading of the following detailed description with reference to the accompanying drawings, in which.

While the invention is described and illustrated herein with respect to certain embodiments, it should be understood that it is not intended to limit the invention to those embodiments. It is intended that the invention covers all alternatives, modifications and equivalents falling within the scope and spirit of the invention defined by the appended claims.

DETAILED DESCRIPTION OF THE INVENTION

Figure 1:
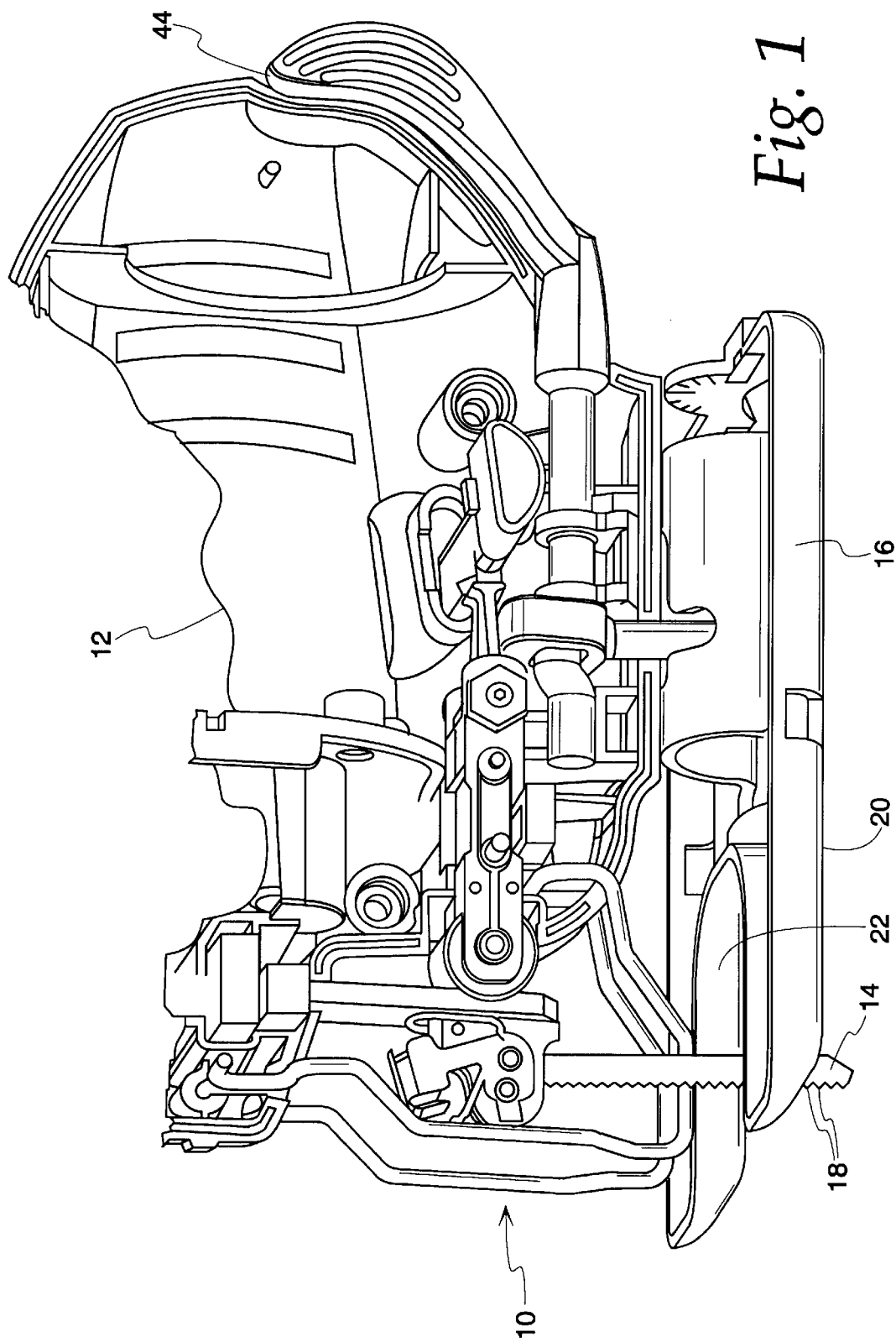
FIG. 1 is a partial perspective view of a jigsaw with a quick release footplate according to the present invention.

Turning first to FIG. 1, there is illustrated, in accordance with an embodiment of the present invention, a jigsaw 10 that includes a housing 12, a flat elongated jigsaw blade 14, and a footplate 16. The blade 14 is secured near the bottom of the front part of the housing 12. The blade 14 has cutting teeth 18 along its forward edge facing in the direction forward of the jigsaw 10. The footplate 16 has an underside 20 that is generally planar, smooth and frictionless so as to guide and support the jigsaw 10 upon the planar surface of a workpiece (not shown) during a cutting operation. The footplate 16 has a generally U-shaped opening 22 through which the blade 14 extends in order to engage the workpiece. During a cutting operation, the jigsaw 10 slides in a generally forward direction thereby engaging the cutting teeth 18 of the reciprocating blade 14 into the workpiece to make the desired cut.

Figure 2:
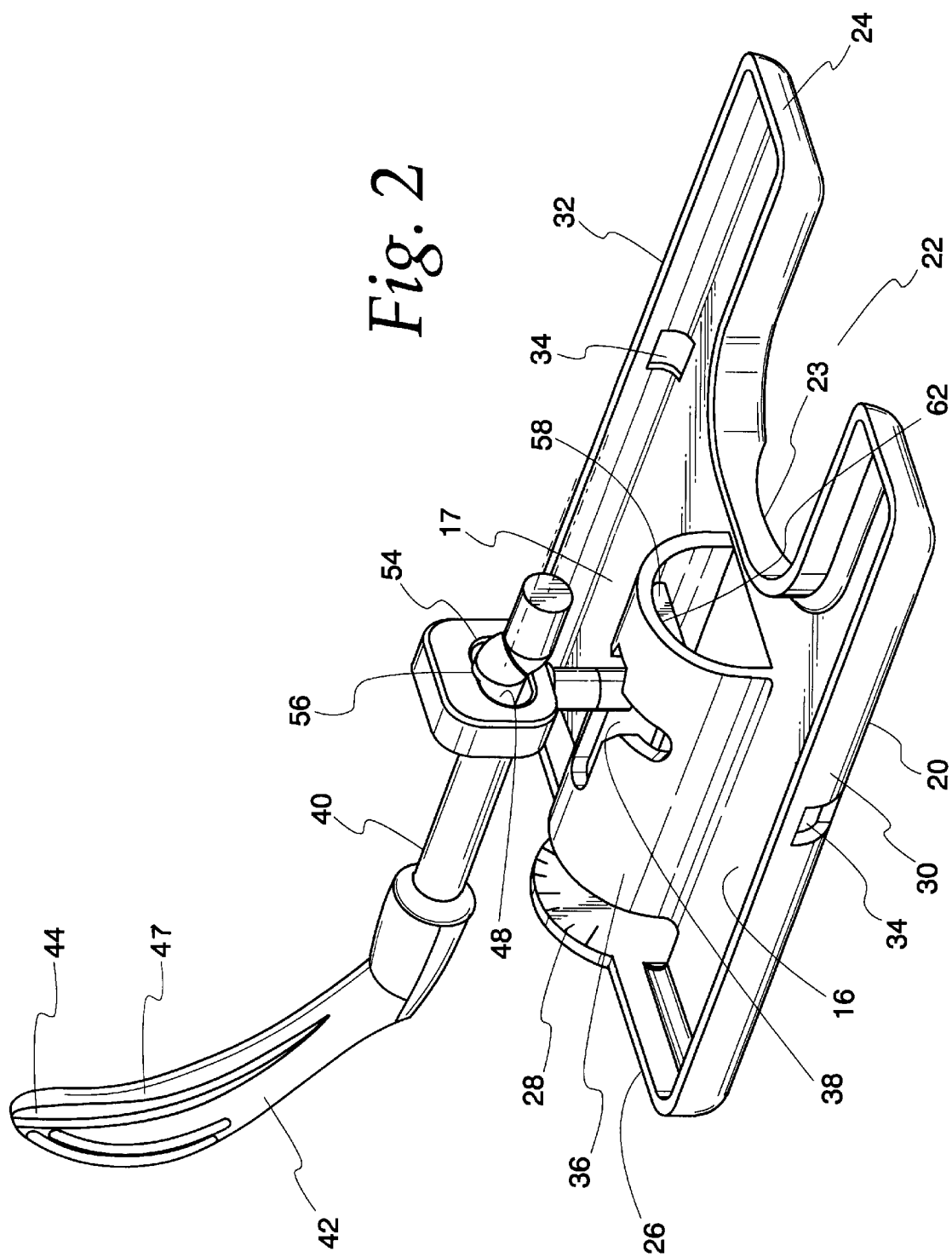
FIG. 2 is a perspective view of a quick release footplate for a jigsaw according to the present invention.
Figure 3:
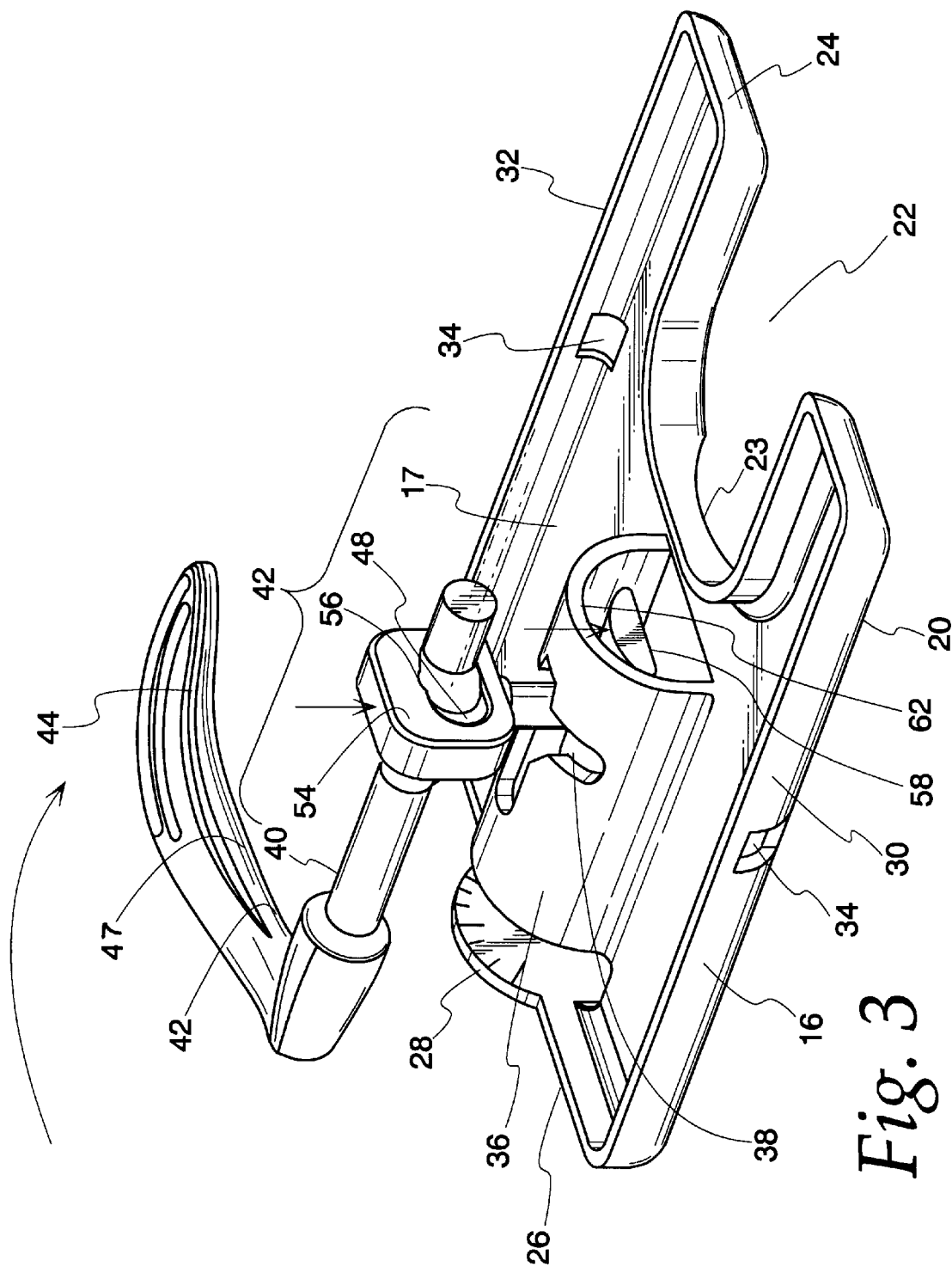
FIG. 3 is a perspective view of a quick release footplate for a jigsaw illustrating a preferred movement of the handle according to the present invention.

Turning now to FIGS. 2 and 3, there is illustrated in greater detail the footplate assembly 16 of the present invention. The footplate 16 is preferably made of cold rolled steel or similar material to provide the strength expected from power jigsaws. In addition, to provide an even smoother guiding surface, the footplate may be fitted with a nylon or plastic guard or sleeve that provides a very smooth surface while the strength of the footplate is still provided by a steel material. The footplate 16 has a base portion 17 which is generally rectangular-shaped, having a U-shaped slot 22 in the front side 24 to accommodate the blade 14. The U-shaped portion 22 may be provided with a raised arc portion 23 from the underside 20, which allows sawdust or other cutting debris to escape therethrough while the blade 14 is cutting and the jigsaw 10 slides along the surface of a workpiece. In order to display the angle of the footplate with respect to the housing, the back side 26 of the base portion 17 of the footplate 16 may be provided with a raised semicircular portion 28, as illustrated. Also as illustrated, opposing sides 30 and 32 of the footplate 16 may be provided with holes 34 to accommodate a rib fence, as known in the art. Between the back 26 of the footplate 16 and the U-shaped portion 22 there is provided an arched bridge 36 which is open underneath. The bridge portion 36 has a cross-shaped slot pattern 38 cut out of the top for use when beveled cuts are desired.

According to an important aspect of the present invention, the footplate assembly 16 includes a shaft portion 40 extending generally in the same axis as the jigsaw and generally perpendicular to the axis of the blade 14. In order to conveniently release and tighten the footplate assembly 16, there is provided a handle 42 that extends outwardly from the shaft 40 and generally transversely to the axis of the shaft. The handle 42 provides a user with significant leverage and mechanical advantage to rotate the shaft 40 and therefore adjust the footplate assembly 16. According to a preferred embodiment, the handle 42 may be provided with a notch 44 on its inside surface 47 extending toward the housing of the jigsaw. This notch 44 interfaces with the housing 12 to retain the handle 42 in a locked position, as can be seen in FIG. 1. As shown in FIG. 3, the handle 42 can be moved about 90 degrees from the vertical position to allow for release of the footplate assembly 16. This feature of the present invention represents an advance over the prior art, because the handle 42 can be moved from a vertical locked position to a 90-degree released position without interfering with the footplate assembly 16 itself and without interfering with the surface of a workpiece upon which the jigsaw may be resting. In other words, the complete throw of the handle for adjustment between a released and locked position may be achieved well above the footplate.

Figure 4:
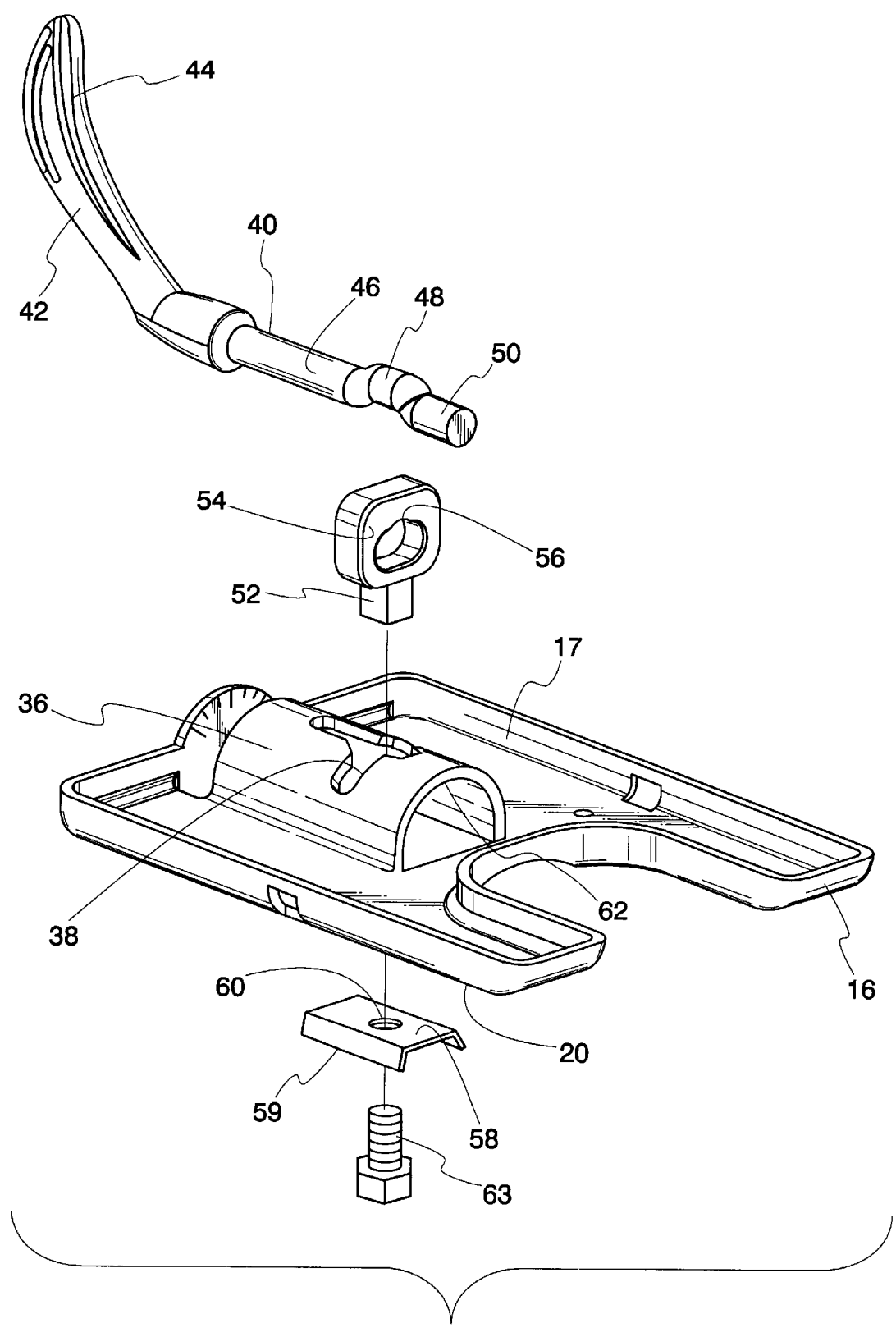
FIG. 4 is a perspective exploded view of a quick release footplate for a jigsaw according to the present invention.

FIG. 4 shows an exploded view of the footplate assembly 16 of the present invention. As best seen in this view, the shaft 40 has a handle 42, a back shaft portion 46, an eccentric cam portion 48, and a front shaft portion 50. The back shaft portion 46 serves as the back support end and the front shaft portion 50 serves as the front support end. The axis of rotation of the shaft 40 and handle 42 is defined by the axis of the back shaft portion 46 and the front shaft portion 50, which are aligned. The back shaft portion 46 and the front shaft portion 50 may be retained for rotational movement by a plurality of ribs internally disposed within the housing 12, or any similar mechanism that allows the shaft 40 to maintain its position relative to the housing while still allowing rotational movement. Thus, there is provided a bearing surface for the back shaft portion 46 and the front shaft portion 50 that allows for rotational movement of the shaft 40. The housing bearing surface provides smooth rotational movement for the shaft 40. If desired, the bearing surface may be increased to further reduce stress on the housing 12, such as by providing an enlarged diameter on a portion of the shaft that is received into a correspondingly larger bearing surface provided by the housing. Such a larger bearing surface would further reduce stress on the housing and provide for easier rotational movement of the shaft 40. As illustrated in FIGS. 2, 3 and 4, the cam portion 48 has a continuous smooth surface and has an axis that is maintained in an eccentric position with respect to the axis of the shaft 40. Thus, the cam portion provides a smooth and even translation of rotational movement to vertical movement when the shaft 40 rotates.

The footplate assembly 16 cooperates with a screw boss 52, having a yoke 54 through which the cam portion 48 is retained. As illustrated, the yoke 54 may be provided with an indentation 56 at the top so that when the cam 48 is flipped up, it sits in the indentation 56, and the handle 42 is in its upward position so that the notch 44 of the handle 42 is engaged with the housing 12. The indentation 56 in the yoke 54 may assist with centering alignment, retaining the shaft 40 in the locked position, and may also serve as an indicator to a user that the shaft is maintained in the locked position. The footplate assembly 16 also cooperates with a bridge plate 58 having a centrally located hole 60 therethrough. The bridge plate 58 is generally rectangular-shaped with bend edges 59 being angled so as to wedge up against underside 62 of the bridge 36.

Upon assembly, the shaft portion 50 is placed through the yoke 54 so that the cam portion 48 of the shaft 40 is resting in the yoke 54. The bridge plate 58 fits up against the underside 62 of the bridge 36. The screw boss 52, mounted to the yoke, with the shaft portion 40 in place, then sits aligned with the hole 60 of the bridge plate 58. A screw 63 is then threadedly secured into the screw boss 52 so as to hold the bridge plate 58 securely against the bridge 36 for a completed assembly as seen in FIGS. 2 and 3. In order to maintain the screw 63 in the screw boss 52 during cutting operations which typically result in extreme vibrations, the screw may be provided with a nylon patch or other resilient material.

Upon use of the jigsaw during a cutting operation, as seen in FIG. 2, the handle 42 is maintained in its most upward position, and the cam 48 is seated in the indentation 56 of the yoke 54. As a result, the bridge plate 58 is secured tightly against the underside 62 of the bridge 36 of the base portion 17 of the footplate 16, thereby securing the footplate 16 to the housing 12 and thus being in a locked position.

Referring to FIG. 3, when the handle 42 is released from the housing 12, the cam 48 is then disengaged from the indentation 56 of the yoke 54 thereby causing the bridge plate 58 to be released from the underside 62 of the bridge 36 thus allowing the base portion 17 of the footplate 16 to be moved and repositioned.

Figure 5:
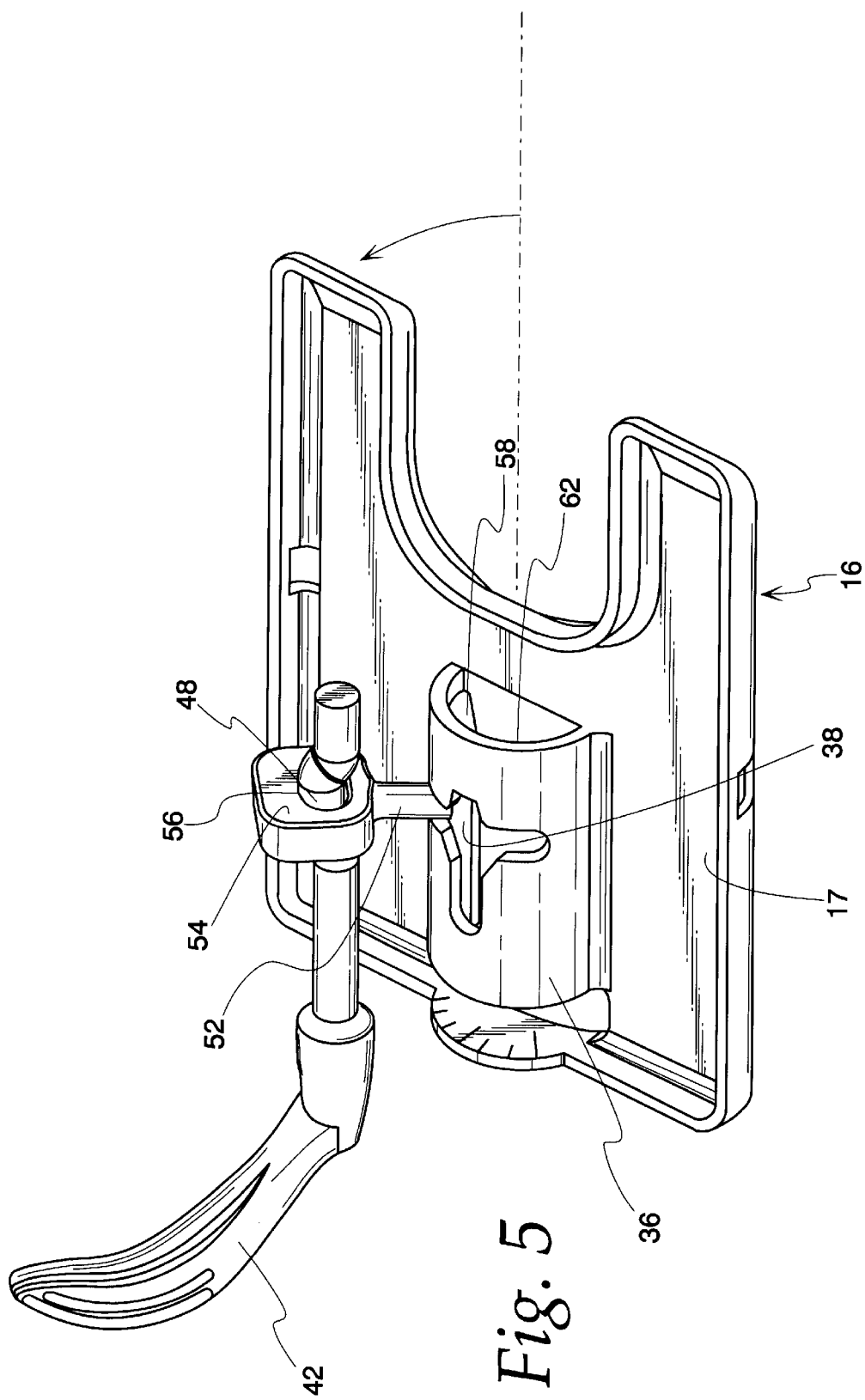
FIG. 5 is a perspective view of a quick release footplate for a jigsaw in an angled beveled position according to the present invention.

The cam 48 and yoke 54 arrangement allows adjustment of the footplate assembly 16 for a beveled cut, as shown in FIG. 5. As illustrated, the handle 42 is maintained in its upward locked position, engaged with the housing 12. The cam 48 is seated in the indentation 56 of the yoke 54, and the bridge plate 58 is flush with the underside 62 of the bridge 36, thereby securing the base portion 17 of the footplate 16 to the housing 12, while the footplate 16 is secured at an angled or beveled position with respect to the housing. The screw 63 may be moved into a position of the cross-shaped section 38 as needed for a beveled cut. In this position, the cam 48 and yoke 54 still function to secure the footplate 16 while allowing for a beveled cut in a workpiece.

In an alternate embodiment, the footplate assembly 16 cooperates with a retaining bolt (not shown) having a yoke 54, through which the cam portion 48 is retained. The footplate assembly 16 further cooperates with the bridge plate 58 having a centrally located hole 60 therethrough and which is disposed on the retaining bolt. The bridge plate 58 is generally rectangular-shaped but the top surface may be arched so as to fit flush against the similarly arched underside 62 of the bridge 36.

Upon assembly, the shaft portion 50 is placed through the yoke 54 so that the cam portion 48 of the shaft 40 is resting in the yoke 54. The bridge plate 58 fits flush against the underside 62 of the bridge 36. The retaining bolt, with the shaft portion 40 in place, then fits through the hole 60 of the bridge plate 58 so as to hold it securely against the bridge 36. The retaining bolt, which is threaded at the end, is then threadably secured by a nut (not shown) for a completed assembly. In order to maintain the nut upon the retaining bolt during cutting operations which typically result in extreme vibrations, the nut, like the screw 63, may be provided with a nylon patch or other resilient material.

While only two embodiments of the quick release footplate for a jigsaw of the present invention has been described and illustrated in detail herein, it will be evident to one of ordinary skill in the art that other embodiments may be possible without departing from the scope of the following claims.

What is claimed is:

1. A jigsaw having a housing and a releasable footplate assembly, said footplate assembly comprising:
   an elongated shaft having a generally transversely extending handle and an eccentric cam portion, said shaft being retained for rotational movement within said housing;
   a screw boss having a yoke disposed at one end and engaged with a screw at the other end, said yoke receiving the cam portion of said elongated shaft;
   a generally planar footplate including an arched bridge having an aperture through which the screw extends; and
   a bridge plate which is engaged with said screw, said bridge plate engaging said bridge of said footplate and maintaining said footplate in a secured position with respect to said housing when said elongated shaft is in a first rotational position, and said bridge plate disengaging said bridge of said footplate and releasing said footplate for movement relative to said housing when said elongated shaft is in a second rotational position.

2. The jigsaw of claim 1 wherein the yoke has an indentation to accommodate the cam portion when said shaft is in said first position.

3. The jigsaw of claim 1 wherein the elongated shaft and the screw boss are maintained substantially within said housing of said jigsaw, and said handle is maintained substantially outside of said housing of said jigsaw.

4. The jigsaw of claim 3 further comprising means for retaining said handle in a predetermined relationship with said housing when said shaft is in said first rotational position.

5. The jigsaw of claim 1 wherein the relationship between said first rotational position and the second rotational position of said shaft is not greater than 90 degrees.

6. The jigsaw of claim 1 wherein said aperture of said arched bridge includes a transversely extending portion to allow for bevel cutting.

7. The jigsaw of claim 1 wherein said aperture of said arched bridge forms a substantially cross pattern.

8. A releasable footplate assembly for a jigsaw comprising:
   an elongated shaft having a handle and a cam portion;
   a screw boss that rotationally receives the cam portion of the shaft;
   a footplate including a base portion and a bridge portion; and
   a bridge plate, attached to a screw, releasably engaging the bridge portion, the screw extending through the bridge portion and received by the screw boss.

9. The footplate assembly of claim 1 wherein the screw boss has a yoke for rotationally receiving the shaft.

10. The footplate assembly of claim 9 wherein the yoke has an indentation to accommodate the cam portion when the assembly is maintained in a secured position.

11. The footplate assembly of claim 10 wherein the screw includes a nylon patch.

12. The footplate assembly of claim 1 wherein the bridge plate can be moved between a fully secured position and a fully released position with a range of motion of the handle that does not exceed 90 degrees.

13. The footplate assembly of claim 1 wherein the footplate includes an arched portion to allow cutting debris to escape.

14. The footplate assembly of claim 1 where the bridge portion includes a transversely extending aperture to allow for beveled cutting.

15. The footplate assembly of claim 1 wherein the bridge plate and the bridge portion have complimentary engaging surfaces.

16. The footplate assembly of claim 1 wherein the elongated shaft is maintained such that the axis of the elongated shaft extends generally parallel to a cutting direction.

17. The footplate assembly of claim 1 wherein the elongated shaft is rotationally retained by the housing of the jigsaw.

18. The footplate assembly of claim 1 wherein the handle includes a notch that can be received in the housing of a jigsaw to retain the handle and the assembly in a secured position.

19. A releasable footplate assembly for use with a jigsaw comprising:

an elongated shaft having a handle and an eccentric cam portion;

a footplate including a base portion and a bridge portion; and retention means for releasably engaging the bridge portion to a bridge plate, said retention means further having means for rotationally receiving the cam portion of the elongated shaft.

20. A releasable footplate assembly for use with a jigsaw comprising:

an elongated shaft having a handle and a cam portion;

a footplate including a base portion and a bridge portion; and retention means for releasably engaging the bridge portion to a bridge plate, said retention means further having means for rotationally receiving the cam portion of the elongated shaft;

wherein the retention means further comprises a yoke for rotationally receiving the elongated shaft.

* * * * *